Aug. 21, 1951 H. D. SHEKELS 2,564,794

FIELD OF VISION PLOTTING DEVICE

Filed June 14, 1948 4 Sheets-Sheet 1

INVENTOR.
HOWARD D. SHEKELS

BY
Williamson & Williamson
ATTORNEYS

INVENTOR.
HOWARD D. SHEKELS
BY
Williamson & Williamson
ATTORNEYS

Inventor
HOWARD D. SHEKELS

By Williamson + Williamson
Attorneys

Aug. 21, 1951

H. D. SHEKELS 2,564,794

FIELD OF VISION PLOTTING DEVICE

Filed June 14, 1948

4 Sheets-Sheet 4

INVENTOR.
HOWARD D. SHEKELS
BY
Williamson & Williamson
ATTORNEYS

Patented Aug. 21, 1951

2,564,794

UNITED STATES PATENT OFFICE 2,564,794

FIELD OF VISION PLOTTING DEVICE

Howard D. Shekels, St. Paul, Minn.

Application June 14, 1948, Serial No. 32,765

5 Claims. (Cl. 88—20)

This invention relates to methods and apparatus for determining and plotting the field of vision of the human eye.

It is now recognized by oculists that, if the field of vision of a human eye can be plotted, the plot will be highly useful to the oculist in analyzing deficiencies of sight as well as improper functioning of other parts of the human system. If plots of the field of vision of the eye are once or successively taken and abnormal conditions are found in the field of vision, steps can often be taken in the way of remedial medical treatment to discover and sometimes overcome or check conditions that may be detrimental to the health of the patient. Thus, for example, in certain instances it is possible to discover brain tumor through plotting field of vision of the eyes prior to the time that the brain tumor manifests itself in other ways, and by remedial operation it is possible to remove the tumor prior to the time that a malignant growth, such as a cancer, has developed. In other instances it is possible to spot conditions causing pressure on certain nerves and to thereafter remedy these conditions. It is highly important, therefore, to the medical profession that there be available a simple and fast method and apparatus for determining and plotting the field of vision of the human eye, and it is one of the objects of this invention to provide such a method and apparatus.

More specifically, it is an object of the present invention to provide a method of plotting the field of vision of the human eye which consists generally in intermittently exposing a light at numerous spaced points in a predetermined path located in a plane substantially normal to the straight forward line of vision of the eye and recording on a chart, representing the possible field of vision of the eye, the relative positions that the light source is seen as it is exposed at the predetermined points, whereby a graph of the field of vision of the eye is secured.

Another object is to provide a simple apparatus which can be readily employed in a doctor's office to quickly secure a graph of the field of vision of the human eye.

A more detailed object is to provide a screen on which a beam of light may be thrown intermittently in a predetermined path at numerous spaced points radially and circumferentially spaced from a central point on the screen toward which the eye of the patient is directed and to provide a chart representing the possible field of vision of the eye along with a recording mechanism under the control of the patient which can be actuated each time that the beam of light is seen to secure an impression on the chart which will correspond in its representation on the chart to the position that the light beam will appear on the screen when it is seen by the eye.

The objects and advantages of the invention will more fully appear from the following description made in connection with the accompanying drawings, wherein there is shown an apparatus for carrying out the methods of the invention and in which.

Figures 8, 9, 13, 14, 15:
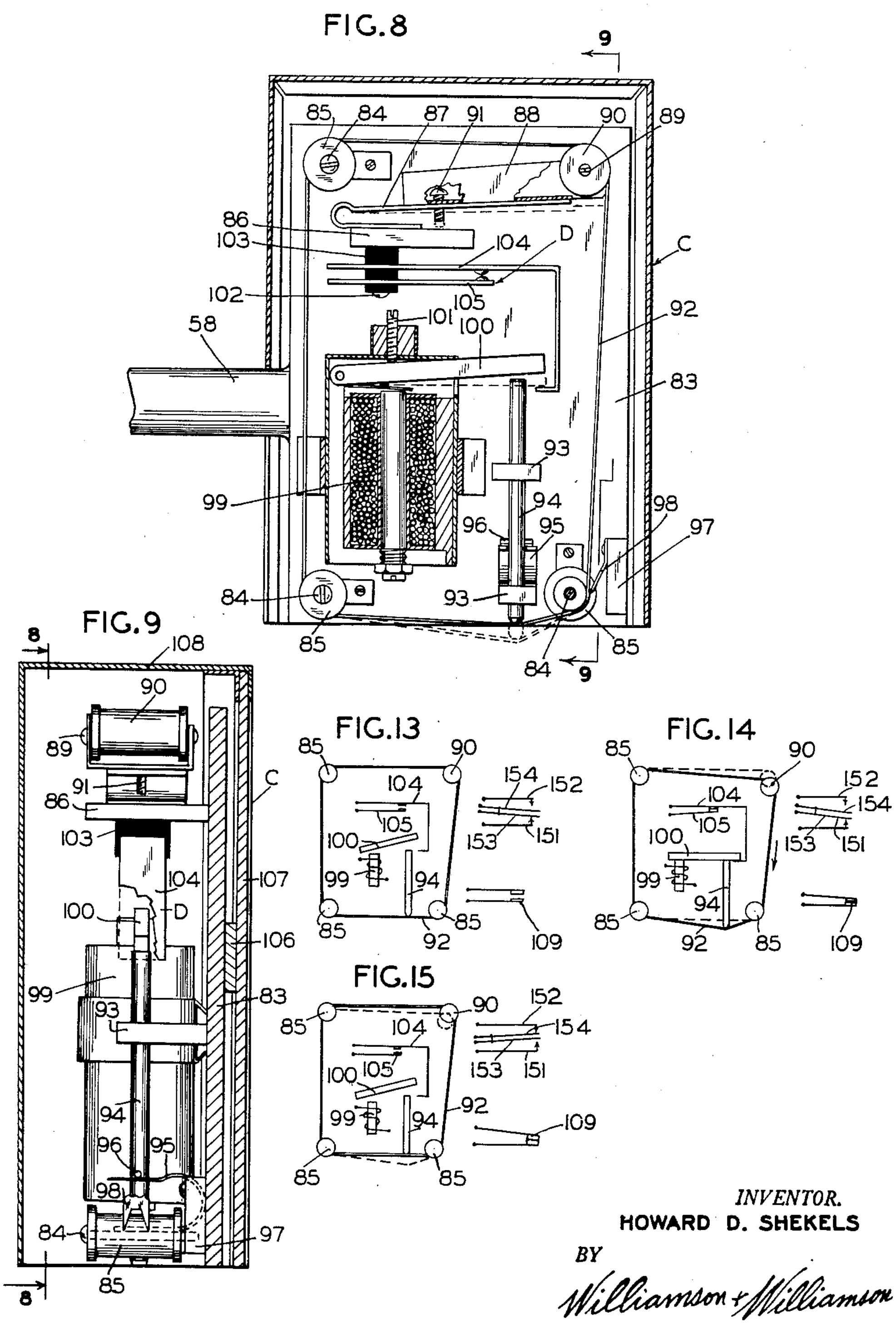
Fig. 8 is a view in enlarged scale of the recording head, the view being taken substantially on the line 8—8 of Fig. 9 and showing the parts in longitudinal section.
Fig. 9 is a transverse section taken substantially on the line 9—9 of Fig. 8.

Figs. 13, 14, and 15 are diagrammatic views illustrating the operation of the recording head.

The apparatus will be first described, whereupon the general operation of the device will be described.

The apparatus includes a main box-like casing 16 equipped with a removable front section 17 and a removable top rear section 18, the main casing being equipped with suitable handles for carrying it and the main casing and front section 17 and top rear section 18 being also equipped with cooperating fastening elements for removably securing the three parts together. The front section 17 fits over a rectangular frame 19, which is fitted into the front side of the main casing 16. This frame in turn carries what may be termed generally as a screen A. Mounted in the lower part of the frame 19 is a bail-like extensible bracket 20, which carries at its forward end a clamping socket 21 within which an angular standard 22 may be secured. Mounted on the forward portion of the standard 22 is a chin rest 23 for receiving the chin of the patient in such relation that either eye of the patient may be located directly forward of the center of the screen A. The chin rest 23 is swiveled on the standard 22, and the central portion of the chin rest is offset from the standard 22, whereby when the chin rest is located as shown, the head will be located centrally somewhat to the right of the center of the screen A, while as the chin rest 23 is turned through 180°, the chin rest will be centered to the left of the standard 22. Normally the device will be supported as upon a suitable stand or table 24, and in order to better brace the head of the patient a small pivoted bail-like support 25 is attached to the clamping socket 21 which can be swung down to rest on the table. By loosening the thumb screw of the clamping socket 21, the standard 22 can be raised or lowered so as to permit of vertical adjustment for locating the eyes of different individuals at the proper level relative to the center of the screen A.

A horizontal shaft 26 is journaled in suitable bearings 27 depending from the upper portion of the casing 16 behind the screen A. This shaft carries at its forward end a U-shaped frame 28, which will revolve with the shaft, and extending between the two arms of this frame adjacent the forward ends thereof are a pair of guide rods 29 on which a carriage 30 is slideably mounted. The carriage 30 forms an enclosed light housing 31, and in this housing is located an electric light socket 32, in which a light bulb 33 is mounted. Aligned with the central portion of the light bulb 33 is a forwardly projecting light tube 34 through which a beam of light from the bulb 33 may shine. Also attached to the housing 31 is a bracket 35 carrying a forwardly projecting pin 36 on which a roller 37 is journaled. A counterbalancing weight 38 is secured to an arm 39 projecting from the lower portion of the frame 28 to counterbalance the effect of the opposite portion of the frame from that portion to which the arm 39 is secured, the frame extending generally in a direction away from the shaft 26 opposite the counterbalancing weight 38.

While the screen A can be variously formed, in the illustrated embodiment it includes a backing plate 40 having secured to its rear side a spiral track 41, within adjacent convolutions of which both the light tube 34 and the roller 37 are received. Accordingly, as the shaft 26 is revolved, the light carriage 30, sliding on the guide rods 29, will be controlled in its radial movement to and from the axis of the shaft 26 by the spiral track 41. The backing plate 40, at preferably regularly spaced intervals between adjacent sections of the track 41, is equipped with light apertures 42 into alignment with which the light tube 34 is adapted to be successively brought during the rotation of the shaft 26. The backing plate 40 carries studs 43, which may be equipped with wing nuts 44. Replaceably mounted on the studs 43 in front of the backing plate 40 is a colored filter plate 45, and forward of the filter plate 45 and also removably mounted on the studs 43 is a solid plate 46 having small openings 47 aligned with the openings 42 in the backing plate 40 but preferably of somewhat smaller diameter than the openings 42. Forward of the plate 46 and also removably mounted on the studs 43 is a diffusion plate 48, which will preferably be made of translucent or transparent plastic having its rear surface ground or roughened so as to tend to cause diffusion of a light beam projected from the bulb 33 through the light tube 34, apertures 42, colored filter plate 45, and apertures 47 in the plate 46. Centrally located at the forward side of the diffusion plate 48 in alignment with the shaft 26 is a target 49, which will be employed as a focal point for the eye of the patient and which will be colored or printed in contrast to the remainder of the plate 48, or may be a mirror.

Mounted on suitable bearings 50 attached to the casing 16 is a vertical turntable shaft 51 having a head at its upper end to which is attached a backing plate 52 and a turntable 53, which overlies the backing plate 52. On the surface of the turntable are suitable securing devices, such as the corner receivers 54, for holding in place a chart on the surface of the turntable, such as the chart B, which will be more fully described in detail hereafter. Attached to the backing plate 52 is a spiral trackway 55, which projects downwardly therefrom and which trackway is generally similar to the trackway 41 previously described but which may be of smaller proportionate dimension. An upstanding guide bracket 56 is mounted on the rear upper portion of the casing 16, and slideably received through an opening, such as a square opening, in this bracket is a shank 57 of square shape to which is secured an upper arm 58, which overlies the turntable 53, and a lower arm 59, which underlies the spiral track 55. The lower arm 59 carries at its forward portion a pair of vertical roller pins 60, which may be received within adjacent channels of the spiral track 55. Mounted on the upper arm 58 to overlie the turntable 53 and the chart B that will normally be mounted thereon is a recording head designated as an entirety by the letter C. With the arrangement described, it will be seen that the recording head C will normally project over the chart B on the turntable 53 and that it will be moved inwardly and outwardly along a line radial to the axis of rotation of the turntable shaft 51 by being guided in the guide bracket 56 by the rollers 60 received in the spiral guideway 45.

Figures 1, 2, 6:
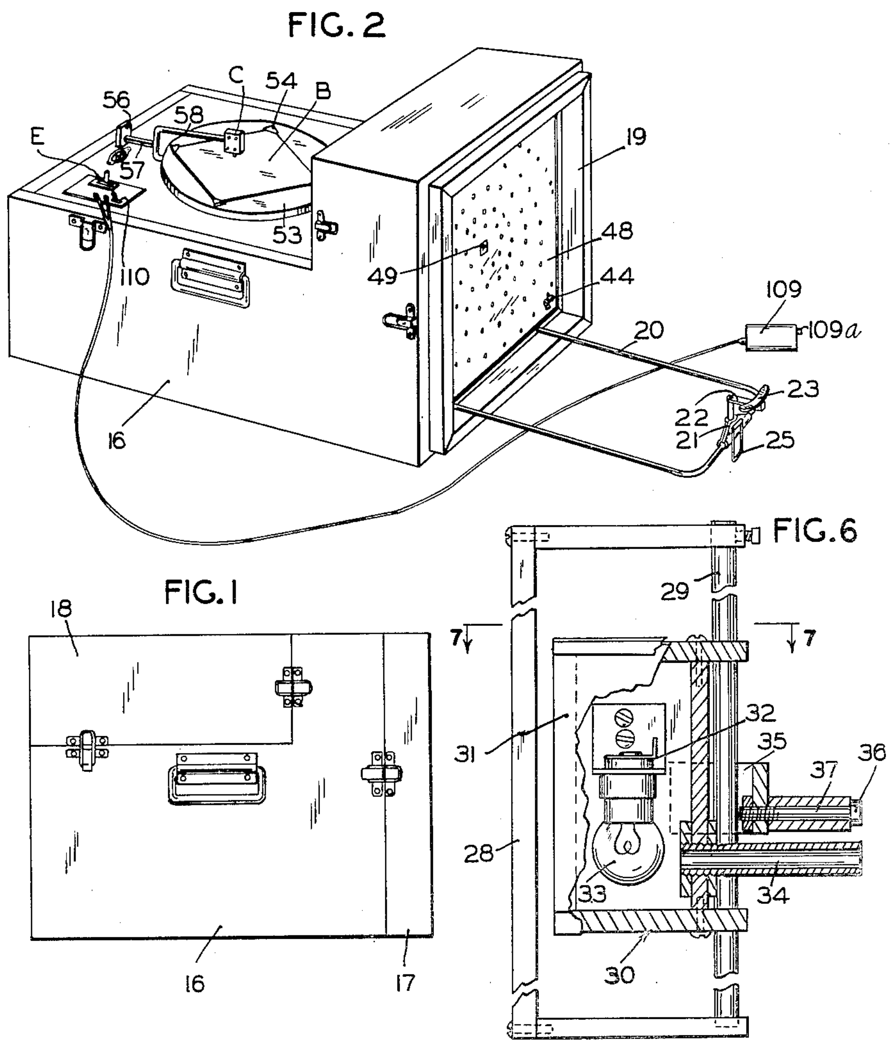
Fig. 1 is a view in side elevation of the apparatus in closed up condition.
Fig. 2 is a perspective view of the apparatus with the front and top cases removed and with the head locating device extended.
Fig. 6 is a view on a still larger scale illustrating the light carriage and associated parts, certain of the parts being broken away and shown in section.
Figure 7:
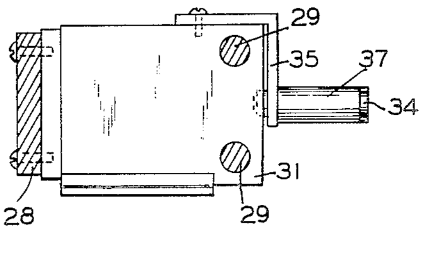
Fig. 7 is a horizontal section taken on the line 7—7 of Fig. 6 as indicated by the arrows.
Figures 3, 5, 11:
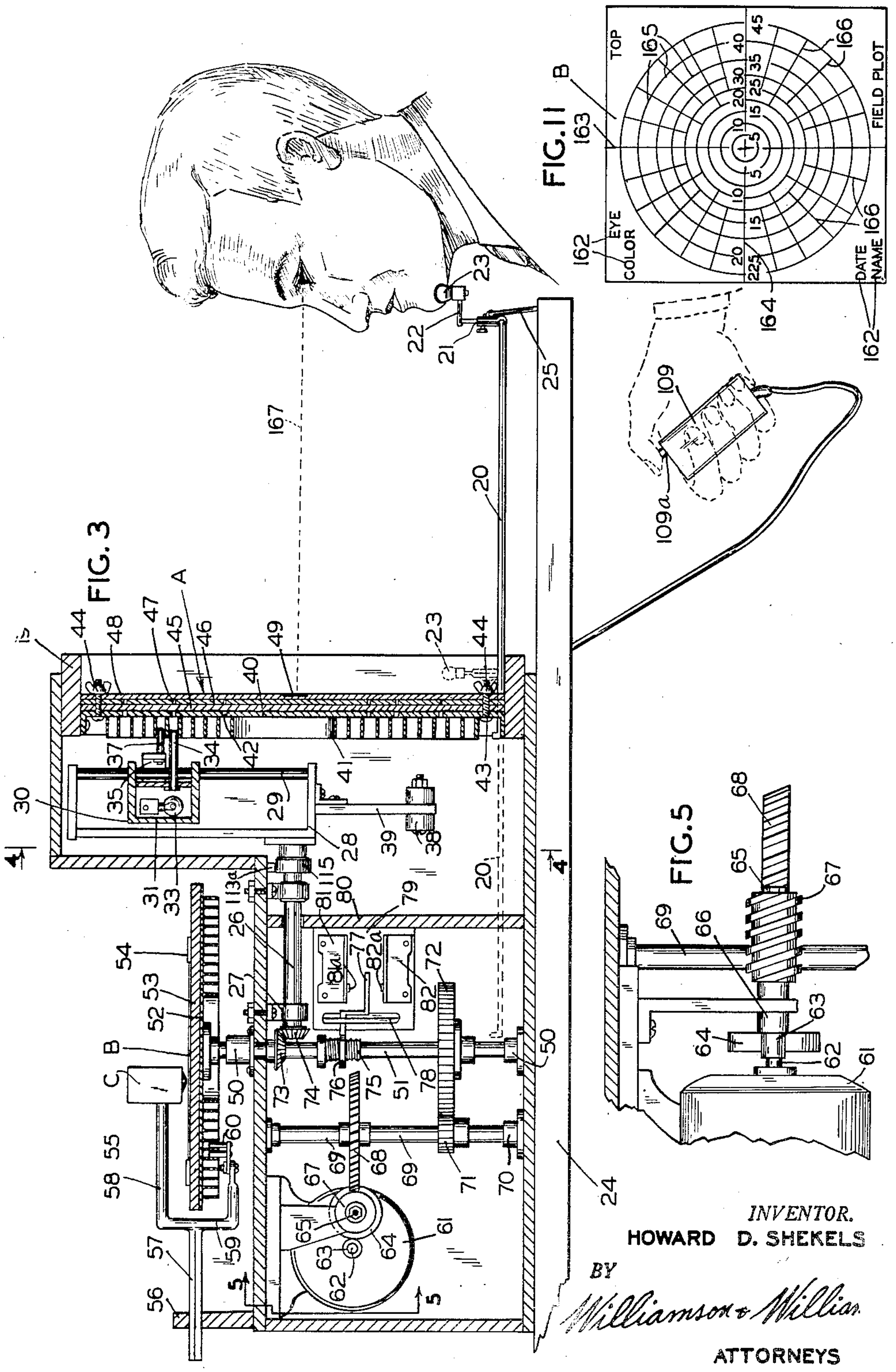
Fig. 3 is a vertical section through the device, showing it in enlarged scale and showing the device in use.
Fig. 5 is a vertical section taken substantially on the line 5—5 of Fig. 3 as is indicated by the arrows.
Fig. 11 is a plan view of a chart employed with the machine for plotting the field of vision of the human eye.

While it is possible to drive the two shafts 26 and 51 in any suitable manner, in the illustrated embodiment there is provided for the purpose a reversible electric motor 61 mounted within the casing 16, this motor including a motor shaft 62 on which a friction wheel 63 is secured. As best seen in Fig. 5, the friction wheel 63 engages a larger friction wheel 64 mounted on a cross shaft 65, journaled in a suitable bearing 66, supported from the casing 16. The shaft 65 in turn carries a worm 67 intermeshing with a worm gear 68 mounted on a vertical countershaft 69 journaled in suitable bearings 70 carried by the casing 16. The countershaft 69 carries a pinion 71 engaging with a larger gear 72 carried by the turntable shaft 51. The turntable shaft 51 carries near its upper end a beveled pinion 73 engaging with a beveled gear 74 of similar size carried by the inner end of the shaft 26, which latter shaft may be designated the light shaft as distinguished from the turntable shaft. Any suitable speed reducing gearing may be substituted for that shown to drive the turntable shaft 51 and the light shaft 26 at relatively slow speed, it being necessary, however, that both shafts turn at the same speed.

The turntable shaft 51 carries a screw 75 running through a nut 76 attached to a microswitch actuating arm 77 guided in a slot formed in a bracket 78 mounted on a panel 79 suitably supported on a partition 80 mounted in the casing 16, the panel carrying two electric microswitches 81 and 82 respectively. The actuating buttons 81*a* and 82*a* of the two microswitches are disposed in opposing relation with a portion of the actuating arm 77 located between them. The two microswitches 81 and 82 are employed, as will be presently brought out more clearly, to stop the motor 61 as the shaft 51 is turned in either direction sufficiently to carry the actuating arm 77 into engagement with one of the two buttons 81*a* or 82*a* of the two microswitches 81 and 82. Assuming that the motor 61 is running in one direction, of course the shaft 51 will be turned in one direction, and as this occurs, the nut 76 will be vertically moved by the screw 75. Let's assume that the rotation of the turntable shaft 51 is such that the nut 76 will be drawn upwardly relative to the shaft 51 and that accordingly the actuating arm 77 will be drawn toward the button 81*a* of the microswitch 81. When finally the actuating arm 77 contacts the button 81*a*, the microswitch will be actuated, and actuation of this switch will break the motor circuit to the motor 61. Thereupon when the motor is again actuated, the circuit must be established through the other microswitch 82 and the motor will turn in the opposite direction than previously. Accordingly the nut 76 will be lowered relative to the shaft 51 until the actuating arm 77 engages the button 82*a* of microswitch 82, thereby opening the switch 82 and again breaking the circuit to the motor as the switch 82 is actuated. Of course as the actuating arm 77 moves away from either button 81*a* or 82*a* of either microswitch, that particular microswitch will again close.

The recording head C, as is best illustrated in Figs. 8 and 9, includes a panel 83, which is fixed to the forward end of the arm 58 which overlies the turntable 53. Pivot studs 84 are mounted in suitable brackets carried by this panel adjacent the two lower corners of the panel and adjacent the top left-hand corner as illustrated and journaled on these studs are spool-like rollers 85. A block 86 is mounted near the upper portion of the panel 83, and attached to this block is a spring arm 87 carrying a bracket 88, which projects over toward the right upper corner of the panel and carries at that point a pivot stud 89 on which a fourth spool-like roller 90 is journaled. A set screw 91 is carried in the bracket 88 and it projects through the spring arm 87 and it cooperates with the block 86 to limit the possible downward swinging movement of the roller 90, the set screw being adjustable in the bracket to vary this possible movement. Trained over the four rollers 85 and 90 is an endless ink-carrying typing ribbon 92, such as is commonly employed on typewriters. The lower run of this ribbon between the two lower rollers 85 extends close to the lower edge of the panel 83, and accordingly it is located close to the top of the turntable 53. Vertically mounted for sliding movement in a pair of lugs 93 attached to the panel 83 is a key 94, and the lower part of this key is preferably beveled, and the key is located so as to strike the lower run of the ribbon 92 between the two lower rollers 85. The key 94 is normally urged upwardly by a spring 95 attached to the lower lug 93 and of forked U formation, the forked portions of the spring straddling the key and engaging a short crosspin 96 carried by the pin. A block 97 is secured to the extreme right-hand corner portion of the panel 83, and this block carries a spring forked prong 98, which bears against the right side of the ribbon 92 as it works over the lower right-hand roller 85, and the two points of this prong, by preventing back travel of the ribbon 92, permit of movement of the ribbon over the four rollers 85 and 90 only in a clockwise direction as viewed in Fig. 8.

A relay 99 is also mounted on the panel 83, and this relay has a spring actuated armature 100, the upward movement of which is limited by an adjustable set screw 101, and the outer end of the armature 100 overlies the upper end of the key 94. Obviously, as the relay 99 is energized, the armature 100 will be attracted and moved downwardly against the tension of the armature spring, thereby depressing the key 94 to move the key from the full-line position shown in Fig. 8 to the dotted line position there shown, and as this occurs, the lower run of the ribbon 92 will also be depressed. The movement of the key 94 will be sufficient for the key to press that portion of the ribbon 92 which it strikes against the chart B held on the turntable 53, as seen in Fig. 3, whereupon an impression will be printed by the ribbon on the said chart, this impression taking the form of a dot. As the lower run of the ribbon 92 is depressed by the key 94, the upper right-hand roller 90 will be depressed against the tension of the spring arm 87, the parts moving from about the position diagrammatically shown on Fig. 13 to the position shown in full lines in Fig. 14. Thereupon as the relay 99 is deenergized, the armature spring 95 will raise the key 94, and as this occurs, some slack in the ribbon 92 will result, and the spring arm 87 will thereupon raise the roller 90 from the down position shown in Fig. 14 to the full-line position shown in Fig. 15. As this occurs, the prong 98 will prevent back travel of the ribbon 92 in a counterclockwise direction, and as a result the slack portion of the ribbon will cause a slight advancement of the ribbon over the two left-hand rollers 85 and the roller 90. Then when the relay is again energized, the key 94 will strike a fresh portion of the ribbon instead of striking the same portion of the ribbon that it had previously engaged as the key is depressed.

Mounted on the lower side of the block 86 is a stud 102 carrying insulated washers 103, between which are located a pair of contacts 104 and 105 of an electrical switch, which may be designated as an entirety by the letter D. The contact 104 has a downwardly projecting arm with a reversely bent end which lies in the path of movement of the outer end of the armature 100 as the armature is attracted by the relay 99. The two contacts 104 and 105 of the switch D are normally separated, but as the relay 99 is energized and the armature 100 is attracted, the contact 104 will be moved downwardly to establish engagement between the two contacts 104 and 105 of the switch D.

Attached by a spacer 106 to the rear side of the panel 83 is a plate 107. An open-bottomed and open-backed housing 108 having suitable flanges at its top and side edges to receive the top and side edges of the plate 107 may be removably engaged with the plate 107 to receive and enclose the major operating parts of the recording head C. The left side of this housing 108 is slotted to receive the overlying arm 58 to which the panel 83 is secured.

There is supplied with the device a hand switch 109, which can be held in the hand of the patient whose field of vision is to be plotted, as is illustrated in Fig. 3, and this switch has a push key 109*a*, which can be pressed to close the switch and thereby energize the relay 99 of the recording head. Mounted on the upper part of the casing 16 near the turntable 33 is a main line switch 110 subject to hand actuation, while also mounted near the switch 110 is a double pole, three position manual direction control switch, which is designated as an entirety by the letter E. Housed in the casing 16 but not otherwise illustrated except in the wiring diagram Fig. 12 are other electrical appliances.

Figure 10:
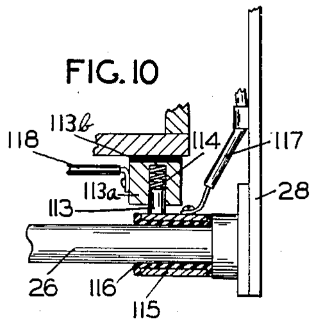
Fig. 10 is a sectional detail illustrating the slip-ring construction for carrying an electrical current to the light carriage.

Referring to Fig. 10 and to Fig. 3, carried by the casing 16 adjacent the shaft 26 is a small block 113*a* insulated from the casing by insulation 113*b*. Within a socket formed in the block 113*a* is located a carbon brush 113 urged by a spring 114 located within the socket into engagement with a slip-ring 115 mounted on the shaft 26 but insulated therefrom by the insulating collar 116. Connected to the slip-ring 115 is a wire 117 carried by the frame 28, which connects with one terminal of the bulb socket 32, the other terminal of the bulb socket being ground to the frame 28. A wire 118 running from a source of electricity is connected to the block 113*a*.

Figure 12:
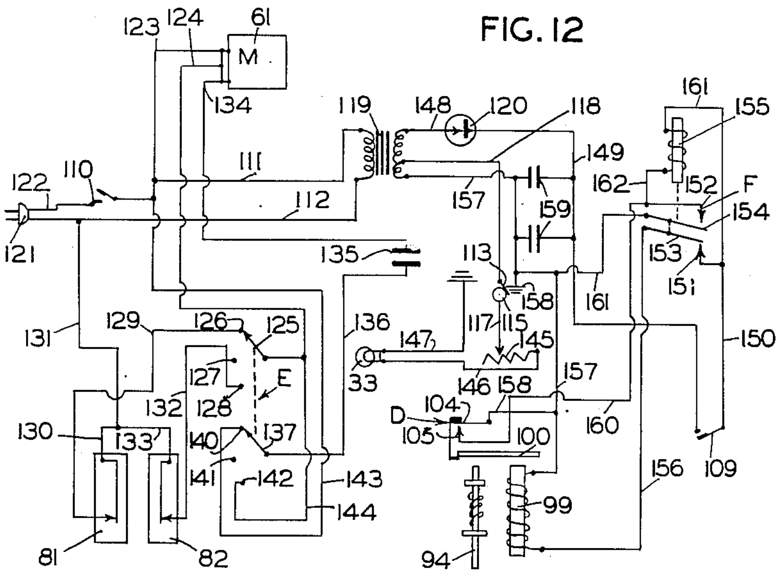
Fig. 12 is a wiring diagram of the device.
Figure 4:
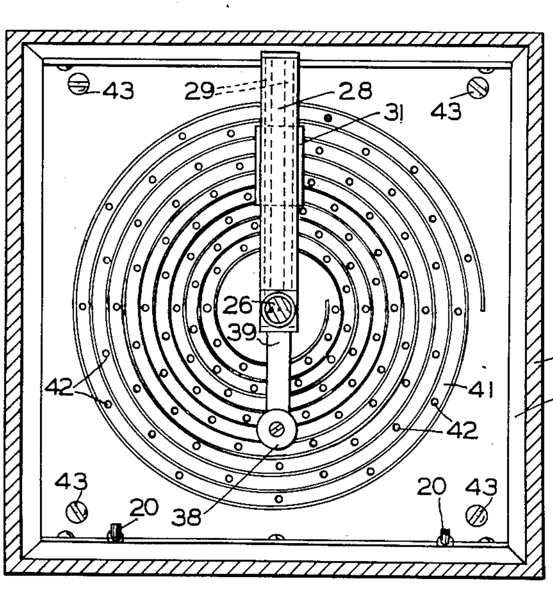
Fig. 4 is a vertical section taken substantially on the line 4—4 of Fig. 3 as is indicated by the arrows.

Referring now to the wiring diagram illustrated in Fig. 12, there is there shown the main line switch 110, the motor 61, which is a reversible condenser type motor, a transformer 119 having primary and secondary windings, a rectifier 120, a relay actuated double-pole double-throw contact switch designated as an entirety by the letter F, the recording head relay 99 with its armature 100, the switch D, the recording key 94, the light 33, the reversing switch E, and the two microswitches 81 and 82.

There is provided a power plug 121, the two prongs of which are adapted to be plugged into a power circuit. From one contact of the power plug, a conductor 122 runs to one contact of the line switch 110, while another conductor 111 runs from the other contact of the line switch to the primary winding of the transformer 119. Another conductor 112 runs from the other end of the primary winding of the transformer back to the other contact of the power plug 121, and accordingly a transformer circuit will be established when the line switch 110 is closed from the plug 121 through the conductor 122, line switch 110, conductor 111, to the primary winding of the transformer 119, and thence through the conductor 112 back to the power line through plug 121.

From the conductor 111 another conductor 123 runs to one contact of the motor 61. Another conductor 124 runs from another contact of the motor 61 to one of the two movable contacts 125 of the double-pole three-position switch E. The movable contact 125 is adapted to be selectively engaged with any one of three contacts 126, 127, and 128. From contact 126 a conductor 129 runs to the fixed contact of microswitch 81. From the movable contact of the microswitch 81 a conductor 130 runs to a conductor 131, which is connected to conductor 112 running to one contact of the power plug 121. From contact 128 a conductor 132 runs to the fixed contact of microswitch 82, while a conductor 133 runs from the movable contact of microswitch 82 to conductor 131. When the movable contact 125 of switch E engages contact 127 at a medial position between the contacts 126 and 128, of course the switch E is open.

Another conductor 134 runs from the third contact of the motor 61 to one side of a condenser 135. From the other side of the condenser 135, a conductor 136 runs to the second movable contact 137 of the double-pole three-position switch E. The movable contact 137 may be selectively engaged with any one of three contacts 140, 141, and 142. A conductor 143 runs from contact 140 to connect with conductor 111 and thus with conductor 123 back to the motor 61. A conductor 144 runs from contact 142 to connect with conductor 124 which returns to the motor 61. The contact 141 is located medially between the two contacts 140 and 142, and of course when the movable contact 137 engages with contact 141, the switch E is open. The two movable contacts 125 and 137 are ganged mechanically so as to be moved together.

Considering now merely the circuits to the motor 61 and assuming that the two microswitches 81 and 82 are closed and that the double-pole three-position switch E is swung to the position shown on Fig. 12, circuits will be established when the line switch 110 is closed to cause the motor to turn in a single direction, for example, a clockwise direction. Thus one circuit will be established to the motor 61 through plug 121, conductor 122, line switch 110, conductor 111, conductor 123, to the motor and thence from the motor through conductor 124, movable contact 125, fixed contact 126, conductor 129, through microswitch 81, conductor 130, conductor 131, and conductor 112 to the line plug 121. A condenser circuit will be established from the motor 61 through conductor 134, condenser 135, conductor 136, movable contact 137, fixed contact 140, conductor 143, conductor 111, and conductor 123 back to the motor. After the motor 61 has been operated in one direction to rotate the turntable shaft 51 to such a position that the actuating arm 77 is brought into engagement with the button 81*a* of microswitch 81, this switch 81 will open, thereby opening the motor circuit even though the line switch 110 remains closed and thereby stopping the motor 61. To again actuate the motor it will then be necessary to throw the double-pole three-position switch E to such a position that the movable contact 125 engages the fixed contact 128, and the movable contact 137 engages the fixed contact 142. Thereupon a motor circuit will be established from one contact of the line plug 121 through conductor 122, line switch 110, and conductor 123 to the motor and thence from the motor through conductor 124, movable contact 125, fixed contact 128, conductor 132, to the microswitch 82, which is of course closed, thence through conductor 133, conductor 131, and conductor 112, back to the other contact of the line plug 121. A condenser circuit will be established from the motor 61 through conductor 134, condenser 135, conductor 136, movable contact 137, fixed contact 142, conductor 144, and conductor 124 back to the motor 61. These two circuits to the motor will cause the motor to rotate in an opposite direction than formerly, for example, a counterclockwise direction, causing the turntable shaft 51 to rotate in an opposite direction and moving the operating arm 77 to a position where it will eventually engage the button 82*a* of the microswitch 82, thereby opening the microswitch 82 and stopping the motor 61. Each time that the switch E is thrown to a new closed position, therefore, the motor will be operated in a direction reverse from that in which it has been previously operated until one of the two microswitches 81 or 82 is opened to shut off the motor. In some instances it may be desirable to stop the motor 61 at a given position, and this can be readily done without opening the line switch 110 by moving the switch E to a neutral position, i. e., to a position where the two movable contacts 125 and 137 respectively engage the fixed contacts 127 and 141.

A conductor 118 taps the secondary winding of the transformer 119 and runs from the secondary winding to connect with the brush 113, which is in contact with the collector ring 115. From the collector ring a conductor 117 runs to a resistance 145, and a conductor 146 runs from this resistance to the light bulb 33, from whence the circuit is grounded through a conductor 147, the ground being actually effected through the frame of the machine. Accordingly a light circuit is established when the transformer 119 is energized, from the secondary winding of the transformer through conductor 118, brush 113, slip-ring 115, conductor 117, resistance 145, conductor 146, to the light bulb 33, and thence through conductor 147 to ground.

From the secondary winding of the transformer 119 a conductor 148 runs to the rectifier 120, another conductor 149 running from the rectifier to one of the contacts as the fixed contact of the hand switch 109. From the hand switch 109 a conductor 150 runs to one of the two fixed contacts 151 of the double-pole double-throw relay switch F. This switch includes another fixed contact 152 in opposition to the fixed contact 151, and between these two fixed contacts are located two movable contacts 153 and 154 respectively, which are operated by the armature for the relay 155 of the switch F, the two movable contacts 153 being ganged together mechanically. The movable contact 153 of switch F connects with a conductor 156 running to the recording head relay 99, and a conductor 157 runs from this relay 99 back to the other end of the secondary winding of the transformer and to a ground 158. Condensers 159 are interposed between the two conductors 149 and 157.

As has been before explained, the armature 100 of the recording head relay 99 carries a movable contact 104, which is adapted for cooperative engagement with a fixed contact 105. From the fixed contact 152 of switch F, a conductor 160 runs to the fixed contact 105, and a conductor 159 runs from the movable contact 104 to the conductor 157. From the conductor 150 another conductor 161 runs to the relay 155 of the switch F, while another conductor 162 runs from the relay 155 to connect with the conductor 160.

Assuming that the line switch 110 is closed and that the primary circuit to the transformer 119 has therefore been established, of course the light circuit will be established to energize the light bulb 33. Then as the hand switch 109 is closed, a rectified recording head relay circuit will be temporarily established from the secondary winding of transformer 119, conductor 148, rectifier 120, conductor 149, hand switch 109, conductor 150, fixed contact 151, movable contact 153, conductor 156, to the relay 99, and from the relay through conductor 157 back to the other end of the secondary winding of the transformer. As this relay circuit is established, the armature 100 will of course be attracted, thereby actuating the printing key 94 and carrying the movable contact 104 into engagement with the fixed contact 105. As this occurs, assuming the hand switch 109 remains closed, a conditioning circuit will be temporarily established from the secondary winding of transformer 119 through conductor 148, rectifier 120, conductor 149, hand switch 109, conductor 150, conductor 161, relay 155, conductor 162, conductor 160, fixed contact 105, movable contact 104, conductor 159, and conductor 157, back to the other end of the secondary winding of the transformer 119, and accordingly the relay 155 will be energized to cause its armature to be attracted and thereby swing the two movable contacts 153 and 154 to bring the movable contact 153 out of engagement with the fixed contact 151 and to carry the movable contact 154 into engagement with the fixed contact 152. As the conditioning circuit is established, the recording relay circuit is broken by the movement of the movable contact 153 away from the fixed contact 151 and accordingly the relay 99 will be deenergized, whereupon the relay armature 100 will no longer be attracted and the movable contact 104 of the switch D will move out of engagement with the fixed contact 105 to break the conditioning circuit. Before the conditioning circuit is broken, however, what may be called a hold circuit will be established through the relay 155 of switch F to prevent a second energization of the recording head relay 99 and a consequent second actuation of the printing key 94 as long as the hand switch 109 remains closed and in fact until the hand switch 109 is first opened and then closed a second time. This hold circuit will be established from the secondary winding of the transformer 119 through conductor 148, rectifier 120, conductor 149, hand switch 109, conductor 150, conductor 161, relay 155, conductor 162, fixed contact 152, movable contact 154, and a conductor 161 running from the movable contact 154 to the conductor 157, and thence through the conductor 157 back to the other end of the secondary winding of the transformer 119. This hold circuit will remain closed to keep the relay 155 of switch F energized until it is broken by the opening of the hand switch 109.

Referring now to Fig. 11, there is there illustrated a typical chart which may be employed for use with the machine in recording the field of vision of one eye of a patient. This chart will carry certain printed indicia 162 thereon, such as the words "Top," "Eye," "Color," "Date," and "Name," the word "Top" indicating that the edge of the chart near where the word is printed is the top or upper part of the chart. Adjacent the word "Eye" is a blank space which can be filled in with the word "left" or "right" to indicate which eye of the patient is being charted. A blank space will be left near the word "color" to indicate the color of the colored filter plate 45 used in making the plot, and of course the date and name of the patient will be filled in adjacent the words "Date" and "Name" on the chart. The chart is divided by vertical and horizontal coordinate lines 163 and 164, which intersect at the center of the chart, and the chart will also preferably have printed thereon concentrically disposed lines 165 with appropriate degree numerals adjacent each to indicate the visual angle to these lines from a straight forward line of sight of the patient. Other radial lines 166 may also be printed on the chart for ready reference in dividing the chart through the rotational degrees of a circle.

Preparatory to determining and plotting the field of vision of one eye of the patient, one of the printed charts B, which will represent the possible field of vision of a normal human eye, will be placed on the turntable 53 and secured thereon by catching the corners of the chart in the four corner receivers 54 of the turntable. The main line switch 110 will then be closed, and we can assume that at that time the operating arm 77 is in engagement with the push key 82*a* of the microswitch 82 and that the light housing 30 is slid to its closest position toward the axis of the shaft 26 and that the recording head C is in its closest position toward the axis of the turntable shaft 51. Let us assume that it is the left eye of the patient to be first examined. The head of the patient will be positioned on the chin rest 23 substantially as shown in Fig. 3, proper adjustment of the standard 22 having been made in the clamping socket 21 to bring the left eye of the patient in alignment with the target 49. The patient will be asked to look fixedly ahead with the line of sight from the left eye directed straight forwardly to the target 49 as indicated by the dotted line 167 indicated on Fig. 3. The double-pole three-position control switch E will now be actuated to draw it to the position shown in Fig. 12, whereupon the motor 61 will be set in operation to drive the shaft 51 in a clockwise direction as viewed from above it and to drive the shaft 26 in a counterclockwise direction as viewed from the forward end of the shaft 26. As the shaft 26 rotates, the carriage 30 will be moved by the spiral track 41 outwardly on the guide rods 29 and the light bulb 33, which is of course now lit, will successively throw a beam of light intermittently through the successive apertures in the backing plate 40 being directed through these apertures by the tube 34. The beam of light will first pass through the colored filter plate 45, where it may be given a desired characteristic color and will then pass through the apertures 47 in the plate 46 to strike the diffusion plate 48 of the screen, and successive dots of light will thus appear intermittently on the screen A, which is disposed normal to the straight forward line of vision 167 of the eye of the patient. The patient will of course carry the hand switch 109 in his hand, and each time that he observes a dot of light on the screen A he will press the key 109*a* of the switch 109, temporarily closing this switch.

Of course as the carriage 30 works outwardly relative to the spiral track 41 under rotation of the shaft 26, similarly the recording head C moves outwardly along a radial line relative to the turntable 53 and chart B carried thereon, movement being accomplished by reason of the pin 60 being guided by the spiral track 55. As the patient observes one of the dots of light on the screen A and immediately thereafter presses the key 109*a* of the hand switch 109, the recording head C will be in a position over the chart B which corresponds relative to the coordinates 163 and 164 of the chart to the position that the light dot appears on the screen A. As the hand switch 109 is closed, the recorder C will be actuated rapidly a single time irrespective of the length of time that the patient holds his finger on the key 109*a*, and the key 94 will carry a portion of the inked ribbon against the chart and print a spot on the chart which corresponds to the position that the dot of light appears on the screen A as viewed by the eye of the patient. Thus each time that a dot of light appears on the screen a corresponding dot will be printed at the proper position on the chart B, and of course if the patient does not observe with his eye a light dot on the screen A at any particular point that a light dot is displayed, there will be no record on the chart B that at that particular point a light dot was seen.

Eventually the carriage 30 will have traversed the entire screen A while the recording head C will have traversed the entire chart B. When this entire traverse has been completed, the arm will strike the key 81*a* of the microswitch 81, thereby opening the circuit to the motor, as has been explained, and the parts will then become stationary. At such time the light carriage 31 will be at its extreme outward position relative to the axis of the shaft 26, and the recording head C will be at its extreme outward position relative to the axis of the turntable shaft 51.

If now it is desired to test the right eye of the patient, the first chart B will be removed and it will be replaced with a fresh chart B, whereupon the chin rest 23 can be rotated through 180° and the chin of the patient can be again supported on the chin rest and the right eye directed to the target 49. Thereupon the switch E will be thrown to carry the two movable contacts 125 and 137 into engagement with fixed contacts 140 and 142 respectively, and the motor 61 will then rotate in the opposite direction than formerly and a recording can be made on the new chart B of the field of vision of the right eye of the patient. During this second recording, the light carriage 30 will be moved inwardly toward the axis of the shaft 26, while the recording head C will be moved centrally toward the axis of the turntable shaft 51.

When recordings of the two eyes have been completed, the dots on the two charts B, one for the left eye and one for the right eye, will accurately show the points where the patient has observed the light dots on the screen, and thus a complete graph of the field of vision of each eye will be produced. If either eye is abnormal, there may be blank spaces in the chart for that particular eye which will indicate that the eye is blind in certain portions of the field of vision of a normal eye. From this fact the doctor examining the charts may gain useful information which will be of assistance in treating the patient.

In charting the field of vision of an eye, it may be desirable to stop the movement of the light carriage 30 and of the recording head C at certain points where a light dot is exposed to view on the screen A in order to explore meticulously a certain portion of what should be a normal field of vision. The machine may be stopped at any point by throwing the switch E to the neutral position where the two movable contacts 125 and 137 engage with the fixed contacts 127 and 141 respectively, whereupon by operating the switch E to either one of the other two positions, the device can be moved in whichever direction is desired to explore the field of vision in greater detail.

It will be seen that a highly effective method and device have been provided for determining and recording the field of vision of the human eye. It will also be seen that the machine can be used to rapidly explore the field of vision of the eye.

It will of course be understood that various changes may be made in the steps in the process and that various changes may be made in the form, details, arrangement, and proportions of the parts of the apparatus without departure from the scope of the present invention, which, generally stated, consists in the matter shown and described and set forth in the appended claims.

I claim:

1. A device for plotting the field of vision of the eye of a patient comprising a screen, a light source behind the screen, means for moving said light source through a spiral path emanating from the center of the screen, means for exposing the light source to view through said screen at fixed points in the path of travel of the light source and obscuring the light source from view at other points in its path of travel, a turntable rotating in timed sequence with rotation of said light source, a chart representing the possible field of vision of the eye of the patient and adapted to be mounted on said turntable, a recording head for marking said chart overlying said turntable, means under the control of the patient for actuating said recording head to record an impression on said chart each time that the light source is viewed, means for moving said recording head over said turntable radially inwardly and outwardly of the turntable as the light source is moved radially inwardly and outwardly relative to the center of said screen at a distance which bears the same ratio to the size of the chart that the radial spacing of the light source from the center of the screen bears to the size of the screen.

2. The structure defined in claim 1, said recording head actuating means including a switch adapted to be closed by the patient, and means preventing other than a single instantaneous actuation of the recording head as said switch is closed until after the switch has been opened.

3. A device for plotting the field of vision of the eye of a patient comprising a screen, a spiral track applied to the rear portion of the screen, a revolving head, a light carriage mounted for sliding radial movement on said head relative to the axis of rotation of the head, a light mounted in said carriage, means guiding said carriage in said spiral track, a light tube for transmitting a beam from said light to the rear of said screen, said screen having numerous perforations therein into alignment with which said tube is adapted to be successively carried, a turntable, a chart adapted to be carried by the turntable, a recording head overlying said turntable, a spiral track carried by said turntable, means cooperating with said last mentioned spiral track for guiding said recording head radially inwardly and outwardly relative to said turntable proportionately to the chart carried thereby as the light moves radially inwardly and outwardly relative to the axis of rotation of said head, means for rotating said turntable and said head at the same speed, and means under the control of the patient for actuating said recording head to print an impression on said chart.

4. The structure defined in claim 3, a target centrally mounted on said screen, and means for supporting the head of the patient with the eye to be tested directly forward of said target.

5. A device for plotting the field of vision of the eye of a patient comprising a casing, a screen mounted in the forward portion thereof, a rotary head behind the screen, a light carriage radially slidable on said head, a spiral track at the rear of said screen, a light mounted in said carriage, a light tube aligned with said light guided by said spiral track and directed forwardly from said light, said screen having numerous perforations therein arranged in a spiral path into alignment with which said tube is adapted to be successively brought, a turntable mounted for rotation in said casing, means for driving said turntable and rotary head at the same speed, a recording head guided for radial movement over said turntable, guide pins carried by said recording head and working within said last mentioned spiral track, and means under the control of the patient for actuating said recording head to print an impression on a chart carried by said turntable.

HOWARD D. SHEKELS.

REFERENCES CITED

The following references are of record in the file of this patent:

UNITED STATES PATENTS

| Number | Name | Date |
|---|---|---|
| 1,201,631 | Rowntree | Oct. 17, 1916 |
| 1,275,234 | Elsom | Aug. 13, 1918 |
| 1,296,305 | Mehren | Mar. 4, 1919 |
| 1,780,291 | Cameron | Nov. 4, 1930 |
| 1,959,217 | Pieper | May 13, 1934 |
| 2,374,854 | Feinbloom | May 1, 1945 |
| 2,441,031 | Papritz | May 4, 1948 |

FOREIGN PATENTS

| Number | Country | Date |
|---|---|---|
| 211,638 | Germany | July 8, 1909 |

OTHER REFERENCES

Poser (publication) "The Perimeter" from the Optical Journal and Review of Optometry—January 1, 1945—pages 23, 24 and 38.

Patrick (publication) "The Projection Scotometer" from "The Optician"—June 4, 1948—pages 489 and 490.